United States Patent
Sobanski et al.

(10) Patent No.: US 12,331,684 B2
(45) Date of Patent: Jun. 17, 2025

(54) STRUT MICROTUBE COUNTERFLOW EVAPORATOR

(71) Applicant: RTX CORPORATION, Farmington, CT (US)

(72) Inventors: Jon Erik Sobanski, Glastonbury, CT (US); Jacob C. Snyder, East Haddam, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/503,279

(22) Filed: Nov. 7, 2023

(65) Prior Publication Data

US 2025/0146440 A1    May 8, 2025

(51) Int. Cl.
*F02C 7/10* (2006.01)
*F28D 7/16* (2006.01)

(52) U.S. Cl.
CPC ............... *F02C 7/10* (2013.01); *F28D 7/16* (2013.01); *F05D 2260/221* (2013.01)

(58) Field of Classification Search
CPC .... F02C 3/30; F02C 3/305; F02C 7/10; F02C 6/18; F02K 3/115; F02K 3/04; F02K 3/06; F02K 3/062; F02K 3/065; F02K 3/105; F02K 3/08; F28D 7/16; F28D 21/0003; F01K 21/047; F01D 9/065; F22B 1/1815; F28F 13/02; F28F 1/0408; F28F 1/0417; F28F 1/0426; F28F 1/0461; B64D 33/04

See application file for complete search history.

(56) References Cited

U.S. PATENT DOCUMENTS

| | | | | |
|---|---|---|---|---|
| 2,961,150 A | * | 11/1960 | Pirtle | F01D 25/162 415/177 |
| 3,266,564 A | * | 8/1966 | Sabatiuk | F02C 7/105 165/104.19 |
| 3,320,749 A | * | 5/1967 | Castle | F02K 3/115 60/39.511 |
| 6,712,131 B1 | * | 3/2004 | Brinkman | B01D 63/023 165/905 |
| 7,775,031 B2 | * | 8/2010 | Wood | F02C 7/10 165/4 |
| 7,861,510 B1 | * | 1/2011 | Wilson, Jr. | F02C 7/10 165/158 |
| 8,100,634 B2 | * | 1/2012 | Evans | F01D 9/042 415/115 |

(Continued)

FOREIGN PATENT DOCUMENTS

| | | | | |
|---|---|---|---|---|
| EP | 2918957 A1 | * | 9/2015 | ............. F01D 25/12 |
| GB | 2041090 A | * | 9/1980 | ............. F02K 3/115 |
| WO | WO-2023237152 A1 | * | 12/2023 | ............. F02C 3/305 |

*Primary Examiner* — Alain Chau
(74) *Attorney, Agent, or Firm* — Carlson, Gaskey & Olds, P.C.

(57) ABSTRACT

An aircraft propulsion includes a core engine section that defines a core flow path where an inlet airflow is compressed, mixed with fuel, and ignited to generate an exhaust gas flow, an inner nacelle assembly that surrounds the core engine section, an outer nacelle assembly that is spaced radially apart from the inner nacelle assembly, and a strut heat exchanger that extends radially between the inner nacelle assembly and the outer nacelle assembly, within the strut heat exchanger a portion of the exhaust gas flow is placed in thermal communication with a second flow for transferring thermal energy.

18 Claims, 5 Drawing Sheets

(56) References Cited

U.S. PATENT DOCUMENTS

| | | | |
|---|---|---|---|
| 8,522,537 B2* | 9/2013 | Lee | F01N 3/0205 |
| | | | 60/320 |
| 8,616,834 B2 | 12/2013 | Knight, III et al. | |
| 9,702,630 B2* | 7/2017 | Whaites | F28D 7/0008 |
| 10,830,056 B2 | 11/2020 | Erno et al. | |
| 11,078,795 B2 | 8/2021 | Jonnalagadda et al. | |
| 11,976,580 B2* | 5/2024 | Klingels | F01K 21/005 |
| 12,071,889 B2* | 8/2024 | Vitt | F02C 3/107 |
| 12,092,022 B2* | 9/2024 | Sobanski | F02C 3/30 |
| 12,129,774 B2* | 10/2024 | Staubach | F02K 3/06 |
| 12,173,669 B1* | 12/2024 | Miller | F02C 3/305 |
| 2002/0037217 A1* | 3/2002 | Itzel | F01D 9/04 |
| | | | 415/115 |
| 2009/0097963 A1* | 4/2009 | Evans | F01D 9/065 |
| | | | 415/209.3 |
| 2009/0277154 A1* | 11/2009 | Wood | F02C 7/10 |
| | | | 60/39.511 |
| 2011/0131961 A1* | 6/2011 | Lee | F01M 5/001 |
| | | | 60/320 |
| 2015/0354382 A1* | 12/2015 | Pakkala | F01D 9/065 |
| | | | 60/806 |
| 2017/0003080 A1* | 1/2017 | Whaites | F01D 9/02 |
| 2018/0149085 A1* | 5/2018 | Chennoju | F01D 9/065 |
| 2021/0207500 A1* | 7/2021 | Klingels | F02C 3/305 |
| 2021/0247152 A1* | 8/2021 | Roberge | F28D 7/1638 |
| 2023/0150678 A1* | 5/2023 | Klingels | B64D 33/04 |
| | | | 244/55 |
| 2023/0340906 A1* | 10/2023 | Vitt | F02C 3/067 |
| 2023/0407768 A1* | 12/2023 | Staubach | B01D 53/265 |

* cited by examiner

STRUT MICROTUBE COUNTERFLOW EVAPORATOR

STATEMENT REGARDING FEDERALLY SPONSORED RESEARCH OR DEVELOPMENT

This invention was made with Government support under Contract DE-AR0001561 awarded by the United States Department of Energy, Office of ARPA-E. The Government has certain rights in this invention.

TECHNICAL FIELD

The present disclosure relates generally to an aircraft propulsion system that includes a strut mounted heat exchanger where thermal energy is communicated between different flows.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate an exhaust gas flow. Steam injection can provide improved operating efficiencies. Water recovered from the exhaust gas flow may be transformed into steam using thermal energy from the exhaust gas flow. Water recovery and steam generation utilize ducting and heat exchangers exposed to the high temperatures of the exhaust gas. The efficient transfer of thermal energy within heat exchangers may require large surfaces areas that present challenges for implementation as part of an aircraft engine architectures.

SUMMARY

An aircraft propulsion system according to one example disclosed embodiment includes, among other possible things, a core engine section that defines a core flow path where an inlet airflow is compressed, mixed with fuel, and ignited to generate an exhaust gas flow, an inner nacelle assembly that surrounds the core engine section, an outer nacelle assembly that is spaced radially apart from the inner nacelle assembly, and a strut heat exchanger that extends radially between the inner nacelle assembly and the outer nacelle assembly, within the strut heat exchanger a portion of the exhaust gas flow is placed in thermal communication with a second flow for transferring thermal energy.

In a further embodiment of the foregoing aircraft propulsion system, the strut heat exchanger includes an outer fairing assembly that defines an outer surface that extends between a leading edge, a trailing edge, a radially inner end at the inner nacelle assembly and a radially outer end at the outer nacelle assembly.

In a further embodiment of any of the foregoing aircraft propulsion systems, the strut heat exchanger includes an inner cavity that extends between an inner opening open through the inner nacelle assembly and an outer opening that is open into the outer nacelle assembly, and a plurality of tube assemblies that extend through the inner cavity between the inner nacelle assembly and the outer nacelle assembly.

In a further embodiment of any of the foregoing aircraft propulsion systems, the portion of the exhaust gas flow is communicated through the inner cavity and the second flow is communicated through at least one of the plurality of tube assemblies.

In a further embodiment of any of the foregoing aircraft propulsion systems, the plurality of tube assemblies include a plurality of micro-tubes that are supported by at least one support member.

In a further embodiment of any of the foregoing aircraft propulsion systems, the support member includes a turbulator for disrupting laminar flow adjacent to the plurality of tube assemblies.

In a further embodiment of any of the foregoing aircraft propulsion systems, the outer fairing assembly includes a first fairing and a second fairing that are attachable to each other.

In a further embodiment of any of the foregoing aircraft propulsion systems, the portion of the exhaust gas flow flows through the inner cavity in a first radial direction and the second flow flows through the plurality of tubes in second radial direction counter to the first radial direction.

In a further embodiment of any of the foregoing, the aircraft propulsion system further includes a condenser where water is extracted from the exhaust gas flow and an evaporator system where thermal energy from the exhaust gas flow is utilized to generate a steam flow from at least a portion of water that is extracted by the condenser for injection into the core flow path. The second flow includes a flow of water and at least a portion of thermal energy from the exhaust gas flow is communicated to the water flow within the strut heat exchanger.

In a further embodiment of any of the foregoing aircraft propulsion systems, a portion of the condenser is disposed within the outer nacelle.

A heat exchanger for an aircraft propulsion system according to another example disclosed embodiment includes, among other possible things, an outer fairing assembly that defines an outer surface that extends between a leading edge, a trailing edge, a radially inner end, and a radially outer end, an inner cavity that is defined within the outer fairing that defines a first flow path that extends between an inner opening that is disposed at the radially inner end and an outer opening that is disposed at the radially outer end, and a plurality of tube assemblies that extend through the inner cavity that define a second flow path between the inner end and the outer end. The first flow path and the second flow path are configured to transfer thermal energy between flows within the first flow path and the second flow path.

In a further embodiment of the foregoing heat exchanger, the plurality of tube assemblies include a plurality of micro-tubes that are supported by at least one support member.

In a further embodiment of any of the foregoing heat exchangers, the support member includes a turbulator for disrupting laminar flow adjacent to the plurality of tube assemblies.

In a further embodiment of any of the foregoing heat exchangers, the inner cavity is configured to receive a portion of an exhaust gas flow that is generated by the aircraft propulsion system.

In a further embodiment of any of the foregoing heat exchangers, each of the plurality of tube assemblies are configured to receive a portion of a flow that accepts thermal energy from the exhaust gas flow.

In a further embodiment of any of the foregoing heat exchangers, the outer fairing assembly includes a first fairing and a second fairing that are attachable to each other.

A method of operating a gas turbine engine, the method, according to another example disclosed embodiment includes, among other possible things, generating an exhaust gas flow, routing a portion of the exhaust gas flow through an inner cavity of a strut heat exchanger, extracting water from the exhaust gas flow in a condenser, routing a flow of extracted water through a plurality of tubes that extend through the strut heat exchanger that is in thermal communication with the exhaust gas flow, and generating a steam flow by heating the portion of the flow of extracted water with heat from the exhaust gas flow within the strut heat exchanger.

In a further embodiment of the foregoing method, a portion of the condenser is disposed within an outer nacelle and the method includes routing a portion of the exhaust gas flow through the condenser within the nacelle.

In a further embodiment of any of the foregoing, the method further includes directing the portion of exhaust gas flow through the inner cavity in a first radial direction and directing the flow of extracted water through the plurality of tubes in a second radial direction that is counter to the first radial direction.

In a further embodiment of any of the foregoing, the method further includes disrupting laminar flow of the exhaust gas flow with turbulators that are disposed on structures that support the plurality of tubes.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
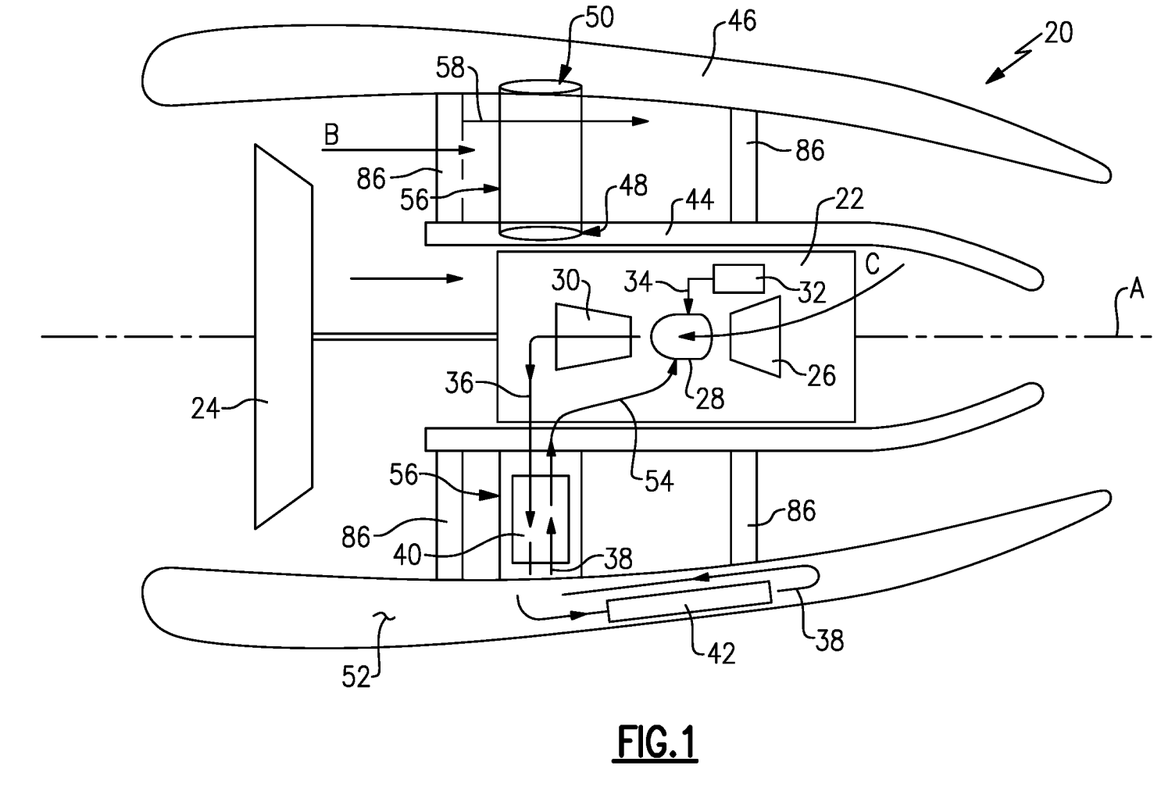
FIG. 1 is a schematic view of an example aircraft propulsion system embodiment.

FIG. 1 schematically illustrates an example propulsion system 20 that includes a strut heat exchanger 56 disposed between an inner nacelle 44 and an outer nacelle. The strut heat exchanger 56 includes an inner cavity within which thermal energy is transferred between different flows.

The example propulsion system 20 includes a fan section 24 and a core engine section 22. The core engine section 22 includes a compressor section 26, a combustor section 28 and the turbine section 30 disposed along an engine longitudinal axis A. The fan section 24 drives inlet airflow as bypass airflow 58 along a bypass flow path B, while the compressor section 26 draws air in along a core flow path C. The inlet airflow is compressed and communicated to the combustor section 28 where the compressed core airflow is mixed with a fuel flow 34 from a fuel system 32 and ignited to generate the exhaust gas flow 36. The exhaust gas flow 36 expands through the turbine section 30 where energy is extracted to generate a mechanical power output utilized to drive the fan section 24 and the compressor section 26.

The example core engine section 22 is a reverse flow engine where core flow is drawn through the compressor section 28 and communicated forward through the combustor section 28 and the turbine section 30. The exhaust gas flow 36 from the turbine section 30 is communicated through a condenser 42 to generate a water flow 38. The water flow 38 is heated within an evaporator 40 to generate a steam flow 54 that may be injected into the core flow path C to increase power output.

The core engine section 22 is disposed within the inner nacelle 44 and the fan 24 is disposed within an outer nacelle 46. The outer nacelle 46 circumscribes the inner nacelle 44 and the bypass flow path B is disposed within a radial space defined between the inner nacelle 44 and the outer nacelle 46. Structural supports 86 extend through the bypass flow path B and support the core engine section 22.

The example propulsion system includes the strut heat exchangers 56 that are utilized to extract and generate a steam flow 54. In the disclosed example, the strut heat exchanger 56 is part of an evaporator 40 and communicates thermal energy from at least a portion of the exhaust gas flow 36 into a water flow 38 to generate the steam flow 54. The transfer of thermal energy between the exhaust gas flow 36 and the water flow 38 occurs within the strut heat exchanger 56. The bypass flow is not utilized to provide thermal transfer within the strut heat exchanger 56. In a disclosed example, a portion of the exhaust gas flow 36 is communicated radially outward through the strut heat exchanger 56. The water flow 38 is communicated radially inward, counter to the exhaust gas flow 36. Accordingly, the example strut heat exchanger 56 is a counter flow heat exchanger.

The example exhaust gas flow 36 and the water flow 38 are schematically shown. The flows 36, 38 would be guided and directed to and through the strut heat exchanger 56 by ducting and conduits disposed within the core engine section 22, the inner nacelle 44 and the outer nacelle 46. In one example embodiment, the strut heat exchanger 56 includes an inner opening 48 that opens through the inner nacelle 44 and an outer opening 50 that opens into a space 52 within the outer nacelle 46. An example condenser 42 is disposed within the space 52 of the outer nacelle 46. Although an example configuration and orientation of the evaporator 40 and condenser 42 are shown by way of the disclosed example, other configurations and orientations of the evaporator 40 and condenser 42 may be utilized and are within the scope and contemplation of this disclosure.

Moreover, although an example engine architecture is disclosed, other turbine engine architectures are within the contemplation and scope of this disclosure. Although the disclosed non-limiting embodiment depicts a turbofan turbine engine, it should be understood that the concepts described herein are not limited to use with turbofans as the teachings may be applied to other types of turbine engines.

Additionally, the features of this disclosure may be applied to other engine configurations utilized to generate shaft power.

The steam flow 54 from the evaporator 40 is injected into the core flow path C at or upstream of the combustor 28 and increases mass flow through the turbine section 30 and thereby increases engine power and efficiency. The propulsion system 20 has an increased power output from the injected steam 54 due to an increasing mass flow through the turbine section 30 without a corresponding increase in work from the compressor section 26. Although the steam flow 54 is shown as being injected into the combustor 28, the steam flow 54 may be injected at other locations along the core flow path C and remain within the contemplation and scope of this disclosure.

Figure 2:
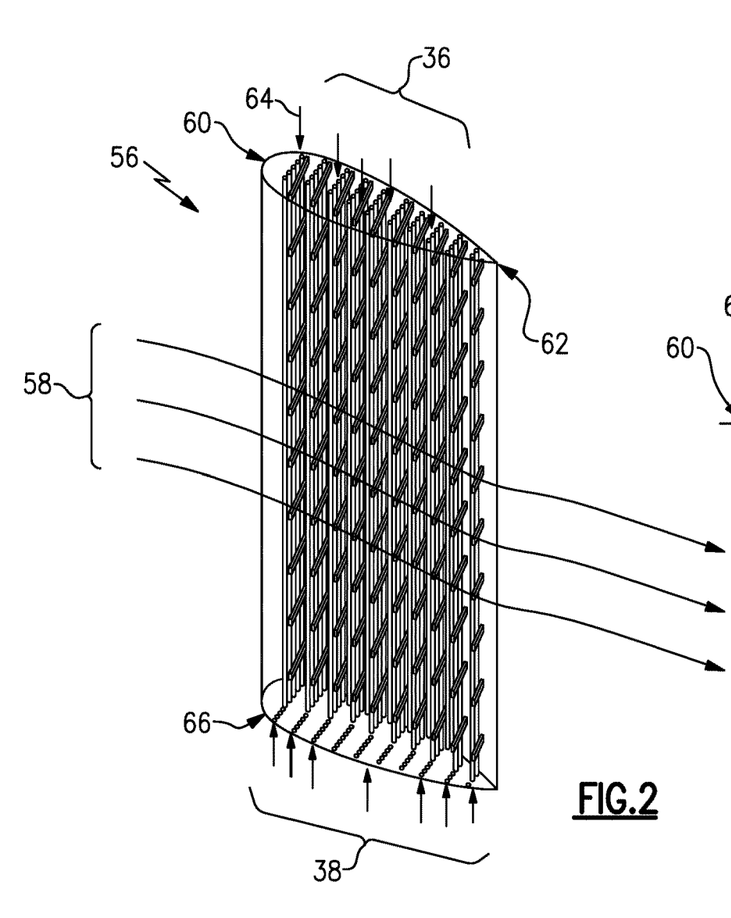
FIG. 2 is a schematic view of an example strut heat exchanger embodiment.
Figure 3:
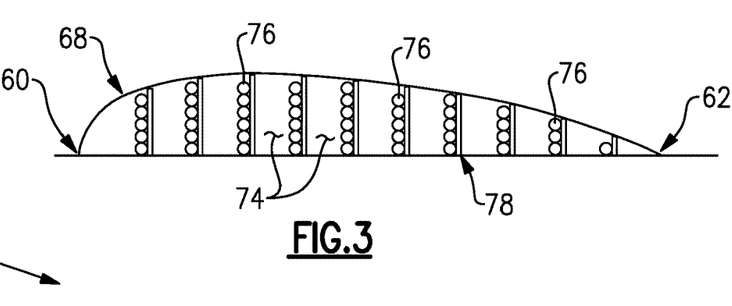
FIG. 3 is a partial cross-sectional view of the example strut heat exchanger embodiment of FIG. 2.

Referring to FIGS. 2 and 3, with continued reference to FIG. 1, the disclosed example strut heat exchanger 56 includes a fairing assembly 68 that extends between a leading edge 60, trailing edge 62, first end 64 and a second end 66. In this example embodiment, the first end 64 is disposed on a radially inner side and includes the opening 48 through the inner nacelle 44. The second end 66 is disposed on a radially outer side and opens into the space 52 of the outer nacelle 46. An inner cavity 74 is defined by the fairing assembly 68 and provides a passage for the exhaust gas flow 36. A plurality of tube assemblies 76 extend through the inner cavity 74 between the first end 64 and the second end 66. The tube assemblies 76 contain the water flow 38. Accordingly, the exhaust gas flow 36 through the inner cavity 74 is in thermal communication with the water flow 38 within the tube assemblies 76.

Figure 4:
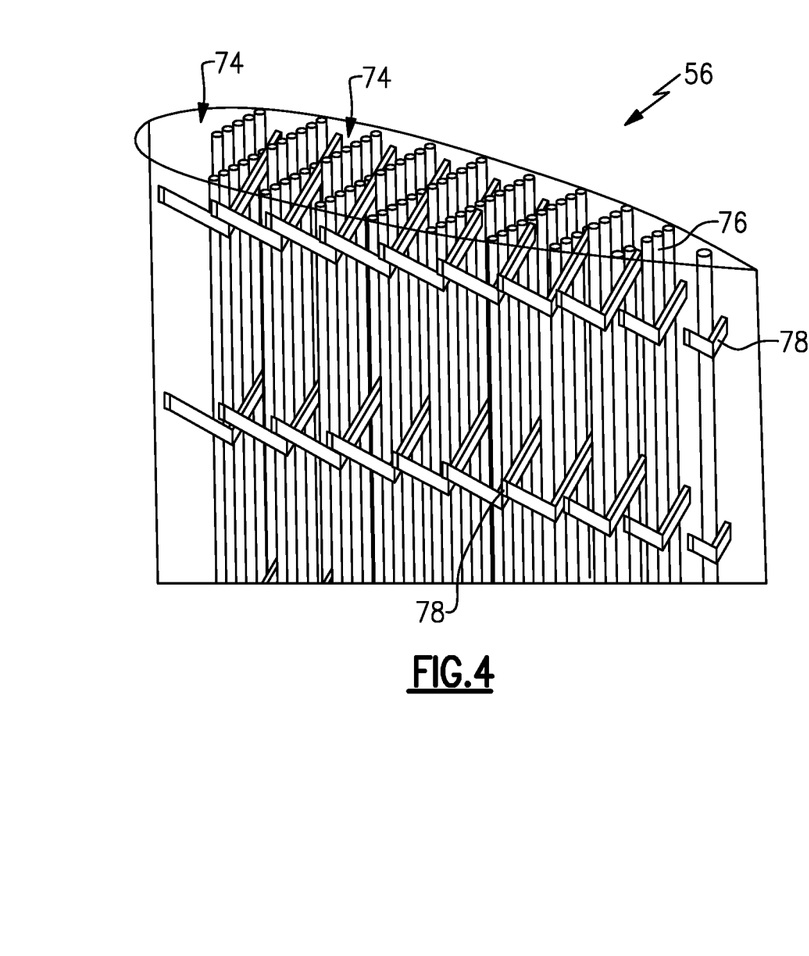
FIG. 4 a partial sectional view of the example strut heat exchanger embodiment of FIG. 2.
Figure 5:
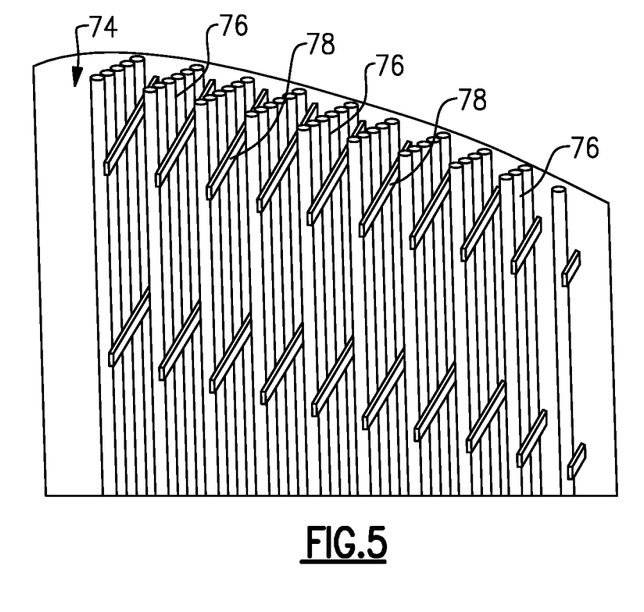
FIG. 5 is another partial sectional view of the example strut heat exchanger embodiment of FIG. 2.

Referring to FIGS. 4 and 5 with continued reference to FIGS. 2 and 3, the tube assemblies 76 are bundled together and held in place by supports 78. The example supports 78 provide structure and rigidity to support and hold the tube assemblies 76 in place. However, the supports 78 are not intended to provide structural support for the core engine section 22 or the nacelles 44, 46. In the disclosed example, each of the plurality of tube assemblies 76 include a plurality of supports 78. The supports 78 are spaced apart radially between the first end 64 and the second end 66 of the strut heat exchanger 56.

Figure 6:
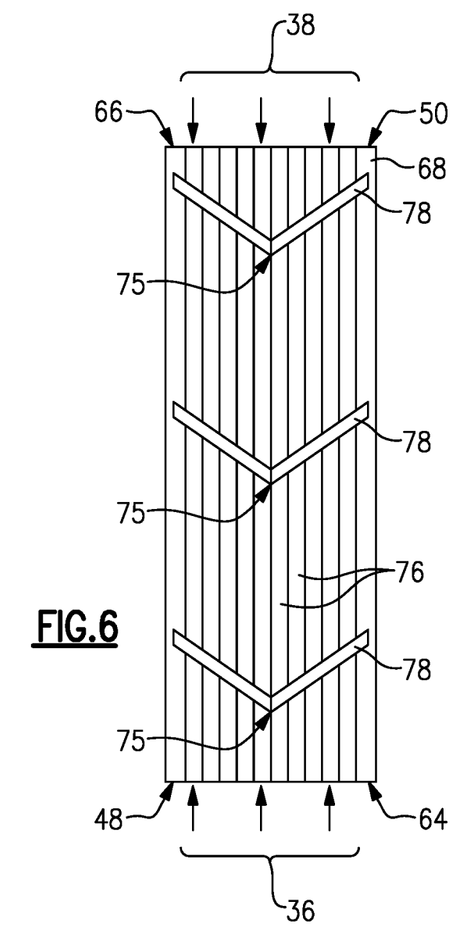
FIG. 6 is another partial sectional view of the example strut heat exchanger embodiment of FIG. 2.

Referring to FIG. 6, with continued reference to FIGS. 4 and 5, the example supports 78 provide the additional function of disrupting laminar flow of the exhaust gas flow 36 to improve thermal transfer. In the disclosed example shown in FIG. 6, the supports 78 include a general chevron shaped turbulator 75 that points counter to the direction of the exhaust gas flow 36. The point of the chevron shaped turbulator 75 points toward the inner opening 48 and the incoming exhaust gas flow 36. The configurations of the supports 78 disrupt the exhaust gas flow 36 along the surface of the tube assemblies 76 and spread the flow and thermal energy outward evenly across the tube assemblies 76. Although a support and turbulator configuration is shown by way of example, other support and flow disrupting turbulator features and configurations may be utilized and are within the contemplation of this disclosure Referring to FIG. 7, tubes 88 of the tube assembly 76 are shown in cross-section. The example tubes 88 are provided as micro-tubes with an outer diameter 80 that is less than or equal to about ¼ inch (6.35 mm). In another example embodiment, the outer diameter 80 is between about ⅛ inch (3.175 mm) and 1.50 inches (38.10 mm).

Figure 7:
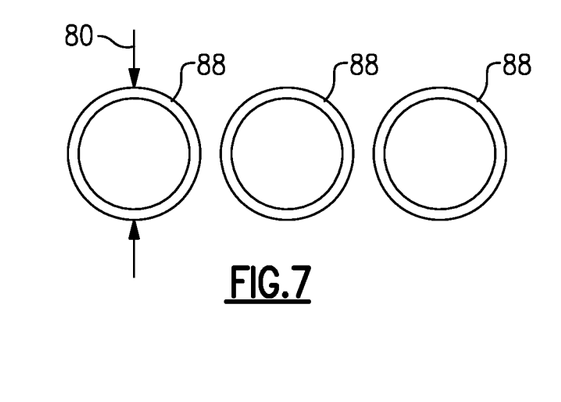
FIG. 7 is a schematic view of a portion of an example tube assembly of a disclosed strut heat exchanger embodiment.

The tubes 88 are constructed of material compatible with the temperatures encountered during operation and that provides for the communication of thermal energy between flows. Moreover, although the example tubes 88 are disclosed as micro-tubes, other tube configurations and shapes could be utilized and are within the contemplation of this disclosure. For example, the tubes 88 may be oval, square, or irregularly shaped to conform to space available space. Moreover, larger tubes may be utilized that provide for thermal transfer between flows.

Figure 8:
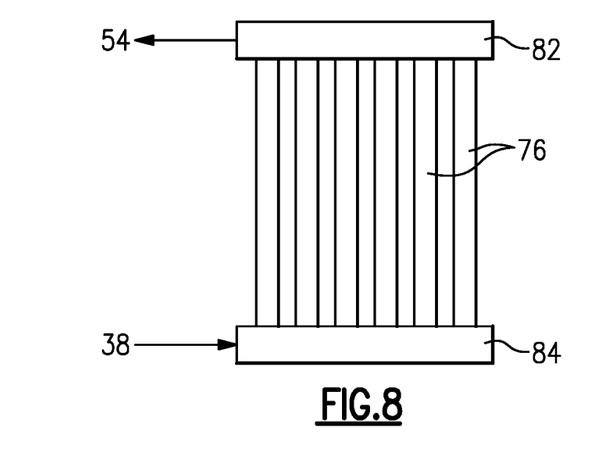
FIG. 8 is a schematic view of an example tube assembly embodiment.

Referring to FIG. 8, an example tube assembly 76 is schematically shown and includes a first manifold 82 and a second manifold 84. The manifolds 82, 84 provide for the communication of flow into and out of the tube assemblies 76. In this example, the water flow 38 is communicated into the example tube assembly 76 through the second manifold 84. The water flow 38 accepts heat from the exhaust gas flow 36 within the tube assembly 76 and is transformed into the steam flow 54 that is communicated to the core flow path C. The manifolds 82, 84 are shown schematically and may comprise one or several structures for communicating water and steam flow through the strut heat exchanger 56.

Figure 9:
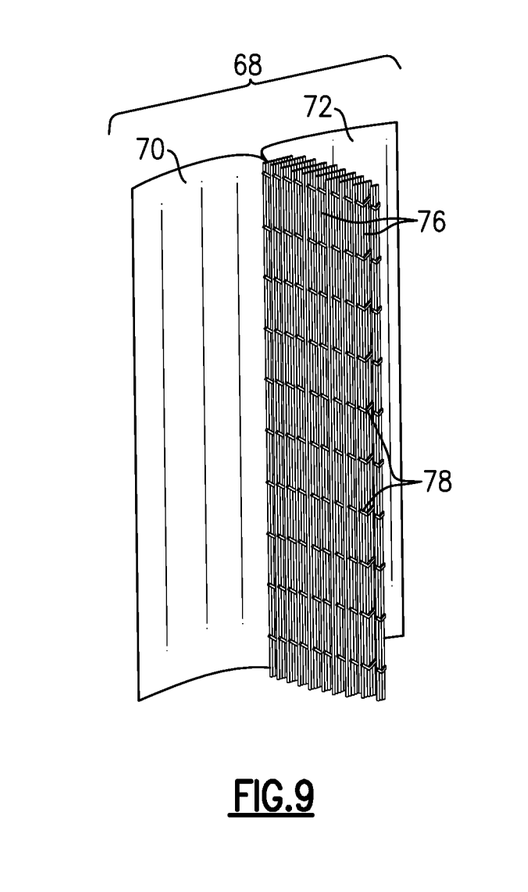
FIG. 9 is a schematic view of a portion of an example fairing assembly of an example strut heat exchanger embodiment at an initial assembly step.
Figure 10:
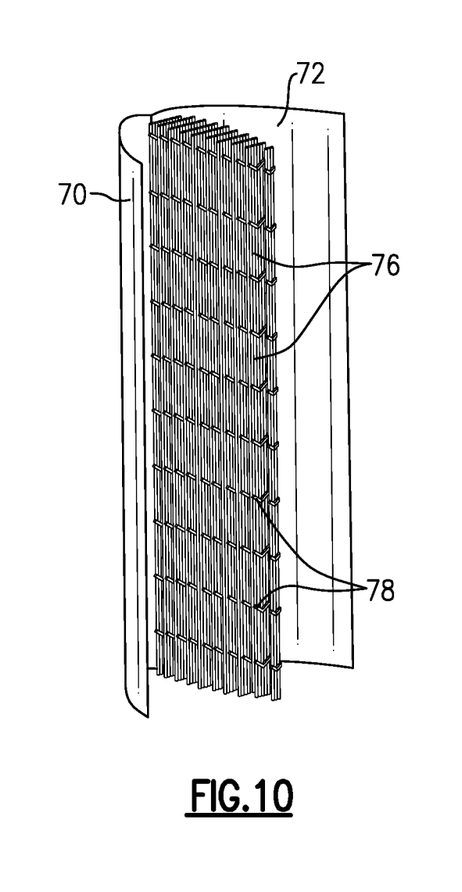
FIG. 10 is another schematic view of the example fairing assembly of FIG. 9 at an intermediate assembly step.
Figure 11:
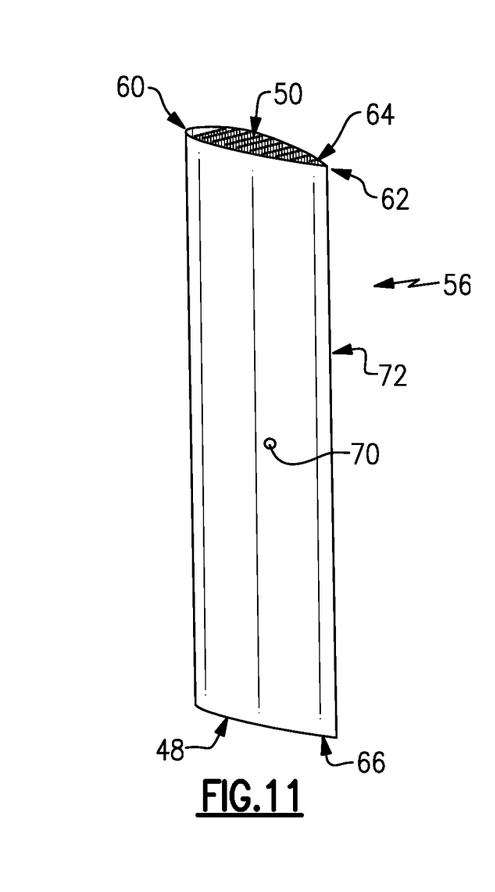
FIG. 11 is a schematic view of the example fairing assembly of FIG. 9 at a final assembly step.

Referring to FIGS. 9, 10 and 11, the example fairing assembly 68 includes a first fairing 70 and a second fairing 72 that wrap around the tube assemblies 76. The example first and second fairing assemblies 70, 72 are mirror images of each other and are joined at the leading edge 60 and the trailing edge 62. The example fairings 70, 72 are formed from sheet material and provided the limited amount of structural rigidity required. Because the example strut heat exchanger 56 is not an engine load bearing structure, the fairings 70, 72 may be formed from relatively light material. In one example embodiment, the fairings 70, 72 are formed from a sheet metal material. In another example embodiment, the fairings may be formed from composite materials. In yet another example embodiment, all or components of the heat exchanger including the fairings 70, 72 are formed utilizing an additive manufacturing process. The entire heat exchange assembly may be formed utilizing additive manufacturing methods and processes. Because the fairings 70, 72 define the inner cavity for the exhaust gas flow 36, the material utilized for the fairings 70, 72 are compatible with the temperatures and pressures generated by the exhaust gas flow 36.

Accordingly, the example strut heat exchanger 56 provides a radial space between nacelles for the transfer of thermal energy between an exhaust gas flow and a water flow.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:
a core engine section defining a core flow path where an inlet airflow is compressed, mixed with fuel, and ignited to generate an exhaust gas flow;
an inner nacelle assembly surrounding the core engine section;
an outer nacelle assembly spaced radially apart from the inner nacelle assembly;
a condenser where water is extracted from the exhaust gas flow to generate a water flow; and
an evaporator system where thermal energy from the exhaust gas flow is utilized to generate a steam flow from at least a portion of the water flow from the condenser, the evaporator system including a strut heat exchanger extending radially between the inner nacelle assembly and the outer nacelle assembly, wherein within the strut heat exchanger a portion of the exhaust gas flow is placed in thermal communication with a portion of the water flow to generate the steam flow for injection into the core engine.

2. The aircraft propulsion system as recited in claim 1, wherein the strut heat exchanger comprises an outer fairing assembly defining an outer surface that extends between a leading edge, a trailing edge, a radially inner end at the inner nacelle assembly and a radially outer end at the outer nacelle assembly.

3. The aircraft propulsion system as recited in claim 2, wherein the strut heat exchanger includes an inner cavity that extends between an inner opening open through the inner nacelle assembly and an outer opening that is open into the outer nacelle assembly, and a plurality of tube assemblies that extend through the inner cavity between the inner nacelle assembly and the outer nacelle assembly.

4. The aircraft propulsion system as recited in claim 3, wherein the portion of the exhaust gas flow is communicated through the inner cavity and the extracted water from the condenser is communicated through at least one of the plurality of tube assemblies.

5. The aircraft propulsion system as recited in claim 3, wherein the plurality of tube assemblies comprise a plurality of micro-tubes supported by at least one support member.

6. The aircraft propulsion system as recited in claim 5, wherein the support member includes a turbulator for disrupting laminar flow adjacent to the plurality of tube assemblies.

7. The aircraft propulsion system as recited in claim 4, wherein the outer fairing assembly includes a first fairing and a second fairing that are attachable to each other.

8. The aircraft propulsion system as recited in claim 4, wherein the portion of the exhaust gas flow flows through the inner cavity in a first radial direction and the water flows through the at least one of the plurality of tube assemblies in a second radial direction counter to the first radial direction.

9. An aircraft propulsion system comprising:
a core engine section defining a core flow path where an inlet airflow is compressed, mixed with fuel, and ignited to generate an exhaust gas flow;
an inner nacelle assembly surrounding the core engine section;
an outer nacelle assembly spaced radially apart from the inner nacelle assembly; and
a strut heat exchanger extending radially between the inner nacelle assembly and the outer nacelle assembly, wherein within the strut heat exchanger a portion of the exhaust gas flow is placed in thermal communication with a second flow for transferring thermal energy, wherein the strut heat exchanger comprises an outer fairing assembly defining an outer surface that extends between a leading edge, a trailing edge, a radially inner end at the inner nacelle assembly and a radially outer end at the outer nacelle assembly,
an inner cavity that extends between an inner opening open through the inner nacelle assembly and an outer opening that is open into the outer nacelle assembly, and a plurality of tube assemblies that extend through the inner cavity between the inner nacelle assembly and the outer nacelle assembly, wherein the portion of the exhaust gas flow is communicated through the inner cavity and the second flow is communicated through at least one of the plurality of tube assemblies;
a condenser where water is extracted from the exhaust gas flow; and
an evaporator system where thermal energy from the exhaust gas flow is utilized to generate a steam flow from at least a portion of water extracted by the condenser for injection into the core flow path, wherein the second flow comprises a flow of water and at least a portion of thermal energy from the exhaust gas flow is communicated to the water flow within the strut heat exchanger.

10. The aircraft propulsions system as recited in claim 9, wherein a portion of the condenser is disposed within the outer nacelle.

11. A heat exchanger for an aircraft propulsion system comprising:
an outer fairing assembly defining an outer surface that extends between a leading edge, a trailing edge, a radially inner end, and a radially outer end;
an inner cavity defined within the outer fairing that defines a first flow path for an exhaust gas flow that extends between an inner opening disposed at the radially inner end and an outer opening disposed at the radially outer end; and
a plurality of tube assemblies that extend through the inner cavity that define a second flow path for a water flow between the inner end and the outer end, wherein the thermal energy from the exhaust gas flow in the first flow path is utilized to generate a steam flow from the water flow within the second flow path.

12. The heat exchanger as recited in claim 11, wherein the plurality of tube assemblies comprise a plurality of micro-tubes supported by at least one support member.

13. The heat exchanger as recited in claim 12, wherein the support member includes a turbulator for disrupting laminar flow adjacent to the plurality of tube assemblies.

14. The heat exchanger as recited in claim 11, wherein the outer fairing assembly includes a first fairing and a second fairing that are attachable to each other.

15. A method of operating a gas turbine engine, the method comprising:
generating an exhaust gas flow;
routing a portion of the exhaust gas flow through an inner cavity of a strut heat exchanger extending through a fan bypass flow passage between an inner nacelle and an outer nacelle;
extracting water from the exhaust gas flow in a condenser outside of the strut heat exchanger;
routing a flow of extracted water through a plurality of tubes extending through the strut heat exchanger in thermal communication with the exhaust gas flow flowing though the inner cavity of the strut heat exchanger; and
generating a steam flow by heating the portion of the flow of extracted water with heat from the exhaust gas flow transferred into the water flow within the strut heat exchanger.

16. The method as recited in claim 15, wherein a portion of the condenser is disposed within an outer nacelle and the method includes routing a portion of the exhaust gas flow through the condenser within the outer nacelle.

17. The method as recited in claim 16, further comprising directing the portion of exhaust gas flow through the inner cavity in a first radial direction and directing the flow of extracted water through the plurality of tubes in a second radial direction that is counter to the first radial direction.

18. The method as recited in claim 17, further comprising disrupting laminar flow of the exhaust gas flow with turbulators disposed on structures that support the plurality of tubes.

* * * * *